United States Patent
Osterloh et al.

(10) Patent No.: US 9,485,325 B2
(45) Date of Patent: Nov. 1, 2016

(54) PRIORITIZED REPORTING OF METERING DATA

(71) Applicant: Itron, Inc., Liberty Lake, WA (US)

(72) Inventors: Christopher Lloyd Osterloh, Waseca, MN (US); James Patrick Ogle, Spokane, WA (US); Bret Gregory Holmdahl, Greenacres, WA (US)

(73) Assignee: Itron, Inc., Liberty Lake, WA (US)

( * ) Notice: Subject to any disclaimer, the term of this patent is extended or adjusted under 35 U.S.C. 154(b) by 224 days.

(21) Appl. No.: 14/285,290

(22) Filed: May 22, 2014

(65) Prior Publication Data

US 2014/0258544 A1 Sep. 11, 2014

Related U.S. Application Data

(63) Continuation of application No. 13/464,678, filed on May 4, 2012, now Pat. No. 8,767,744.

(51) Int. Cl.
| | |
|---|---|
| *H04L 12/28* | (2006.01) |
| *H04L 29/08* | (2006.01) |
| *G01D 4/00* | (2006.01) |
| *H04Q 9/00* | (2006.01) |

(52) U.S. Cl.
CPC .............. *H04L 67/322* (2013.01); *G01D 4/004* (2013.01); *H04L 67/325* (2013.01); *H04Q 9/00* (2013.01); *H04L 67/12* (2013.01); *H04Q 2209/60* (2013.01); *Y02B 90/242* (2013.01); *Y04S 20/322* (2013.01)

(58) Field of Classification Search
CPC .................. H04L 47/24; H04L 47/70; H04L 2012/5679; H04L 47/50; H04L 47/622; H04L 47/6225; H04L 47/623; H04L 2012/5632
USPC .............. 370/395.21, 395.4, 395.41, 395.43, 370/329, 342, 348, 310.2, 322, 328

See application file for complete search history.

(56) References Cited

U.S. PATENT DOCUMENTS

| | | |
|---|---|---|
| 6,380,851 B1 | 4/2002 | Gilbert et al. |
| 6,538,577 B1 | 3/2003 | Ehrke et al. |
| 8,024,724 B2 | 9/2011 | Garrison Stuber et al. |

(Continued)

FOREIGN PATENT DOCUMENTS

| | | |
|---|---|---|
| EP | 1649612 B1 | 6/2010 |
| WO | WO2008086231 A2 | 7/2008 |

(Continued)

OTHER PUBLICATIONS

European Office Action mailed Nov. 7, 2014 for European patent application No. 12169873.2, a counterpart foreign application of U.S. Pat. No. 8,767,744, 4 pages.

(Continued)

*Primary Examiner* — Brenda H Pham
(74) *Attorney, Agent, or Firm* — Lee & Hayes, PLLC

(57) ABSTRACT

A utility company may schedule when and how endpoints report resource consumption data based on relative priorities of endpoints or the customers associated therewith. By associating endpoints with one of multiple different quality of service (QoS) levels, and sending each endpoint a reporting schedule based on its respective QoS level, the utility company may configure prioritized reporting of resource consumption data by endpoints of an advanced metering infrastructure (AMI) with automatic meter reading (AMR).

20 Claims, 5 Drawing Sheets

(56) References Cited

U.S. PATENT DOCUMENTS

| | | |
|---|---|---|
| 8,031,082 B2 | 10/2011 | Cornwall |
| 2005/0160257 A1 | 7/2005 | Kruger et al. |
| 2005/0240540 A1 | 10/2005 | Borleske et al. |
| 2006/0271244 A1 | 11/2006 | Cumming et al. |
| 2008/0092132 A1 | 4/2008 | Stuber et al. |
| 2008/0259844 A1 | 10/2008 | Richeson et al. |
| 2009/0225670 A1 | 9/2009 | Leung et al. |
| 2010/0176967 A1* | 7/2010 | Cumeralto ............. G01D 4/006 340/870.02 |
| 2011/0074599 A1 | 3/2011 | Cornwall et al. |
| 2011/0096711 A1 | 4/2011 | Liu et al. |
| 2011/0255866 A1* | 10/2011 | Van Veen ......... H04B 10/07955 398/35 |
| 2012/0060152 A1 | 3/2012 | Oh et al. |
| 2012/0110379 A1 | 5/2012 | Shao et al. |
| 2013/0055231 A1 | 2/2013 | Hyndman et al. |
| 2013/0103974 A1 | 4/2013 | Bower, III et al. |
| 2013/0110426 A1 | 5/2013 | Van Olst |
| 2013/0138635 A1 | 5/2013 | Park et al. |
| 2013/0145452 A1 | 6/2013 | Ollukaren et al. |
| 2013/0294237 A1 | 11/2013 | Osterloh et al. |
| 2015/0121359 A1 | 4/2015 | Osterloh et al. |
| 2015/0212122 A1 | 7/2015 | Sobotka et al. |

FOREIGN PATENT DOCUMENTS

| | | |
|---|---|---|
| WO | WO2008123995 A2 | 10/2008 |
| WO | WO2011041249 A1 | 4/2011 |
| WO | WO2011094511 A1 | 8/2011 |

OTHER PUBLICATIONS

Office action for U.S. Appl. No. 14/398,940, mailed on Oct. 28, 2015, Osterloh et al., "Efficient Firmware Update in a Narrow Bandwidth System," 9 pages.

Extended European Search Report mailed Oct. 5, 2012 for European patent application No. 12166876.8, 5 pages.

Extended European Search Report mailed Apr. 22, 2013 for European patent application No. 12169873.2, 6 pages.

Office action for U.S. Appl. No. 13/464,678, mailed on Nov. 14, 2013, Osterloh et al., "Prioritized Reporting of Metering Data," 7 pages.

PCT Search Report mailed Jun. 11, 2013 for PCT application No. PCT/US13/32301, 9 pages.

PCT Search Report mailed Jun. 28, 2013 for PCT application No. PCT/US13/32291, 11 pages.

* cited by examiner

| QoS LEVEL | LEVEL 1 | LEVEL 2 | LEVEL 3 |
|---|---|---|---|
| # OF EPs PER QoS LEVEL | 100 EPs | 200 EPs | UNLIMITED EPs |

400

| Endpoint | Priority | QoS Level | Data Collector | DC Load | Reporting Start Time | Reporting Frequency | Attempts |
|---|---|---|---|---|---|---|---|
| 1 | 1 | 1 | 1 | 72% | T0 | every 10 min | 5 |
| 2 | 3 | 3 | 1 | 72% | T2 | every 5 hrs | 3 |
| 3 | 2 | 2 | 1 | 72% | T1 | every 15 min | 4 |
| 4 | 3 | 3 | 1 | 72% | T2 | every 5 hrs | 3 |
| 5 | 3 | 3 | 1 | 72% | T2 | every 5 hrs | 3 |
| ... | ... | ... | ... | ... | ... | ... | ... |
| 127 | 3 | 3 | 2 | 96% | T2 | every 5 hrs | 3 |
| 128 | 1 | 2 | 2 | 96% | T1 | every 15 min | 4 |
| 129 | 3 | 3 | 2 | 96% | T2 | every 5 hrs | 3 |
| ... | ... | ... | ... | ... | ... | ... | ... |
| 411 | 3 | 3 | 3 | 66% | T2 | every 5 hrs | 3 |
| 412 | 3 | 3 | 3 | 66% | T2 | every 5 hrs | 3 |
| 413 | 2 | 2 | 3 | 66% | T1 | every 15 min | 4 |
| ... | ... | ... | ... | ... | ... | ... | ... |
| N | 3 | 3 | M | 69% | T2 | every 5 hrs | 3 |

126 — ENDPOINT REPORTING SCHEDULE 128

PRIORITIZED REPORTING OF METERING DATA

RELATED APPLICATION

This application is a continuation of and claims priority to U.S. patent application Ser. No. 13/464,678, filed on May 4, 2012, the disclosure of which is incorporated by reference herein.

BACKGROUND

An electric, water or natural gas utility company may manage hundreds of thousands or millions of metering devices located at customer sites. Such meters measure utility consumption and may be considered endpoints in a network, which may be configured as an advanced metering infrastructure (AMI) for automated meter reading (AMR). In many situations, utility companies bill their customers monthly, quarterly, or even yearly. In such instances, the utility company may monitor the customers' meters to measure their resource consumption relatively infrequently. For instance, if a utility company bills their customers monthly, it may be sufficient for the utility to obtain a few or even a single meter reading during the billing cycle. However, in some instances utilities may wish to obtain more frequent or timely meter readings for at least some of their customers.

To achieve timelier meter readings, the utility may simply instruct an endpoint associated with each meter in the AMI network to broadcast or "bubble up" its resource consumption data more often. However, increasing the frequency with which endpoints broadcast their resource consumption data will increase the power needs of the endpoints, resulting in shorter battery life for battery powered endpoints. Additionally, more frequent broadcasts are likely to result in more collisions between broadcasts, particularly in narrow band networks which make use of a single fixed radio frequency or a limited range or band of radio frequencies. Collisions are likely to become even more prevalent and problematic in congested networks or those networks serving a relatively large number of densely located endpoints. In such circumstances, increasing the frequency at which endpoints broadcast resource consumption data simply may not be an option.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
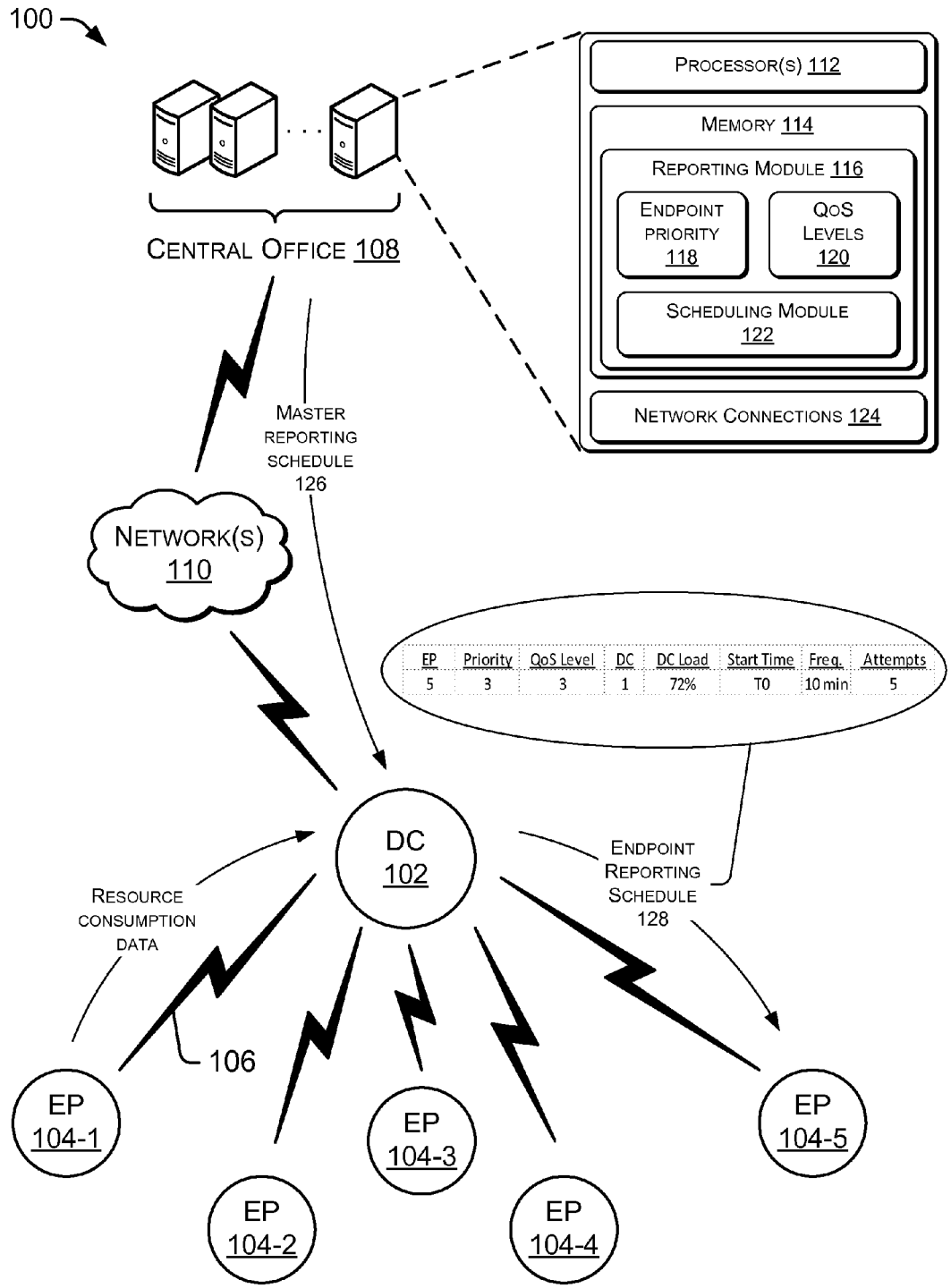
FIG. 1 is a schematic diagram of an example architecture of a wireless network in which different endpoints are scheduled to report their resource consumption data to a data collector based on their quality of service level and/or relative priority.

As discussed above, utility companies typically monitor their customers' resource consumption on an infrequent periodic basis. However, in some instances utilities may wish to obtain relatively more frequent or timely meter readings for at least some of their customers (e.g., commercial customers, consumers of large quantities of a resource, customers with highly variable resource consumption, etc.). Utility companies currently lack an efficient way of obtaining frequent or timely meter readings for certain customers without incurring additional power drain on battery powered endpoints and without substantially increasing network traffic and hence collisions.

This application describes techniques for scheduling when and how endpoints report resource consumption data based on relative priorities of endpoints or the customers associated therewith. Using the techniques described herein, a utility company is able to collect more frequent and/or timely meter readings from endpoints associated with certain customers, without substantially increasing power consumption of meters and/or endpoints and without substantially increasing network traffic.

For example, a utility company may administer a plurality of endpoints. The endpoints may be, or be associated with, a smart utility meter (e.g., electricity meter, water meter, or natural gas meter) and may be configured to relay resource consumption information measured by the smart meters to a central office of the utility company. Such endpoints associated with a smart utility meter are sometimes referred to as metering points. The utility company may wish to obtain consumption data from some of the endpoints earlier and/or more frequently than from other endpoints. Accordingly, the utility company may determine a priority of each endpoint relative to the plurality of endpoints administered by the utility company. The priority of each endpoint may depend on a variety of factors, such as a billing schedule of a customer associated with the endpoint, a service level agreement of the customer associated with the endpoint, and/or a characteristic of the customer associated with the endpoint (e.g., commercial vs. residential, estimated or historically high resource consumption, estimated or historically highly variable resource consumption, etc.).

The utility company may establish multiple different quality of service (QoS) levels associated with the resource-consumption reporting function of endpoints. The utility company may assign each endpoint to one of the multiple QoS levels based at least in part on the relative priority of the respective endpoint and/or its associated customer. Each QoS level may have a different reporting schedule defining the times and frequency that endpoints assigned to the QoS level are to report their resource consumption data. High priority endpoints may be scheduled to report their resource consumption data earlier during a day, so that the resource consumption data for those endpoints will be available for billing and other purposes sooner than other lower priority endpoints. As used herein, "1" designates the highest priority and QoS levels, "2" the next highest, and so on, with higher numbers designating lower relative priority and QoS levels. The utility company may then communicate to each endpoint when the respective endpoint is to report its resource consumption data. In some implementations, the utility company may communicate when the respective endpoint is to report its resource consumption data via a message sent to a data collector associated with the respective endpoint. Thereafter, each endpoint will report its resource consumption data to the central office of the utility via the data collector with which it is associated and according to the reporting schedule received by the respective endpoint. In other examples, the endpoints may report their resource consumption data via one or more other intermediary nodes in the network. As used herein, the term "node" refers to any device on the network which is capable of communicating with other devices of the network, including without limitation, endpoints, data collectors, servers, routers, sensors, control points, relays, etc.

While the examples given herein are described primarily in the context of a network in which endpoints are arranged in direct communication with one or more data collectors, in other examples, aspects of the techniques described herein may also apply to networks in which communications are transmitted through one or more intermediary nodes or endpoints before being transmitted to a central office. For example, the techniques described herein may apply to endpoints arranged in a wireless, utility mesh network, in which communications are passed or relayed from a child node upstream through one or more intermediary nodes on their way to a root node of the network for routing to the central office. Unless otherwise stated, all communications or transmissions described herein may be by broadcast, multicast and/or unicast transmissions.

Example Architecture

FIG. 1 is a diagram illustrating an example networked environment or system 100 of a utility communication network configured for automated meter reading (AMR). The system 100 may include a "root" or data collector (DC) 102 and a plurality of endpoints (EPs) 104-1 through 104-5 (collectively referred to as endpoints 104). The data collector 102 and endpoints 104 may both be considered "nodes" of the AMI. While only one data collector 102 and five endpoints 104 are shown in FIG. 1 for ease of illustration, in practice systems according to this disclosure may include as many nodes as may be present in a utility company's AMI or network.

The data collector 102 may communicate with the endpoints 104 over a common communication channel 106. The common communication channel 106 may utilize a radio frequency (RF) or a wired medium. A wired medium may include dedicated wiring, or may include power line communication (PLC), i.e., a data signal superimposed over an alternating current (AC) power distribution line. The data collector 102 may also communicate with a central office 108 via a wired or wireless network 110, such as the Internet, a cellular network, or the like. The network 110 may itself be made up of one or more other wired and/or wireless networks.

The central office 108 may include one or more severs or other computing devices, which may be arranged in a single location or in multiple distributed locations. Each computing device of the central office may include one or more processors 112 and memory 114. The memory 114 may include processor-readable instructions, which when executed by the one or more processors 112 configure the computing device to perform functions that may include some or all of the functions described herein. The memory 114 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The memory 114 includes a reporting module 116, which is configured to define when and how endpoints are to report their resource consumption data. The reporting module 116 includes endpoint priority data 118, defining relative priorities of the plurality of endpoints in the network, and QoS levels 120 defining when resource consumption data is needed for endpoints having certain characteristics. In some embodiments, the reporting module 116 also includes a scheduling module 122, which may be used to generate a master reporting schedule for the plurality of endpoints 104 based on the priority data 118 and/or the QoS levels 120. Servers of the central office 108 also include one or more network connections 124, which allow the central office servers to communicate with the data collector 102 and other network devices.

In one example, the data collector 102 may be configured to receive information about the plurality of endpoints 104 from which resource consumption data is to be collected. In the example shown in FIG. 1, the information received by the data collector 102 comprises a complete master reporting 126 schedule for the plurality of endpoints, which specifies when each endpoint is to report its resource consumption data to the data collector 102. In other examples, the information received by the data collector 102 may comprise an indication of a relative priority of each of the plurality of endpoints 104 and in indication of multiple quality of service (QoS) levels. In this latter case, the data collector 102 may create or determine a master reporting schedule for the plurality of endpoints based at least in part on the indication of the priority of each endpoint and the indication of the multiple QoS levels. In some implementations, the data collector 102 receives all of the information of the plurality of endpoints 104 from the central office 108. However, in other implementations, the data collector 102 may receive at least some of the information of the plurality of endpoints 104 from the endpoints themselves. For example, each endpoint may be programmed with its relative priority when it is installed at a customer's location. Upon being activated or connected to the network, a newly installed endpoint may transmit its relative priority to the data collector 102.

The data collector 102 is configured to communicate to each of the plurality of endpoints 104 an endpoint reporting schedule 128 of when, based on the received information, the respective endpoint is to report its resource consumption data to the data collector. FIG. 1 illustrates the data collector 102 communicating an example endpoint reporting schedule to endpoint 104-5. The endpoint reporting schedule shown in FIG. 1 includes, among other things, an indication of when (e.g., starting time) and how frequently endpoint 104-5 is to report its resource consumption data. However, in other examples, the endpoint reporting schedule may include other information. Additional details of master and endpoint reporting schedules are described below with reference to FIG. 5.

Once the endpoints 104 have received their endpoint reporting schedules, they are configured to report their data according to the schedules thus received. Accordingly, the data collector 102 will receive resource consumption data from endpoint 104-1, which has a higher priority (and hence better QoS level) than the other endpoints 104-2 through 104-5 shown in FIG. 1. The data collector 102 may also relay the received information from the endpoint 104-1 having the higher priority to the central office 108 of the utility communication network at a time sooner and/or more frequently than the data collector would transmit received information from lower priority (lower QoS level) endpoints to the central office 108. In this way, the utility company is able to collect more frequent and/or timely meter readings from high priority endpoints, such as endpoint 104-1, without substantially increasing power consumption of the endpoints, and without substantially increasing network traffic and/or packet collisions.

Example Data Collector

Figure 2:
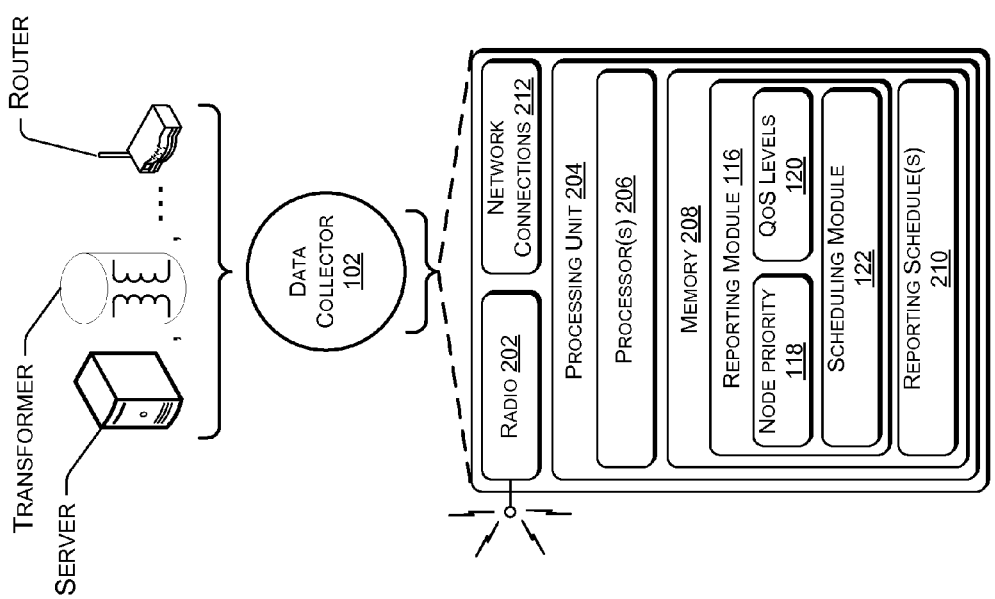
FIG. 2 is a schematic diagram showing additional details of an example data collector of the architecture of FIG. 1.

FIG. 2 is a diagram showing example detail of a data collector, such as the data collector 102 in of FIG. 1. The data collector 102 may be configured as or disposed at a server, a smart transformer, a relay, a router, or other computing device capable of collecting or aggregating communications from a plurality of endpoints. The data collector 102 may include a radio 202 and a processing unit 204. The radio 202 may provide two-way radio frequency (RF) communication between the data collector 102 one or more endpoints (e.g., endpoints 104 in FIG. 1) and other devices in the utility communication network. The processing unit 204 may include one or more processors 206 and memory 208. The memory 208 may include processor-readable instructions, which when executed by the one or more processors 206 perform functions that may include some or all of the functions described herein. In a further example, the functionality of the processor(s) 206 and processor-executable instructions defined in the memory 208 may be performed by a hardware device, such as an application specific integrated circuit (ASIC), a gate array or other hardware-based logic device.

In the example data collector 102 of FIG. 2, the memory 208 may include software functionality configured as one or more "modules." However, as with the memory 114, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). The memory 208 of the data collector 102 may include a node reporting module which may be configured to perform some or all of the functionality of the reporting module 116 of the central office 108 and is therefore designated with the same reference numeral. For example, in the event that the central office 108 does not send the master reporting schedule 126 and instead sends only priority information and/or QoS levels, the reporting module 116 of the data collector may generate a master reporting schedule based on the information received from the central office 108 and/or one or more endpoints 104. The memory 208 of the data collector 102 may also include one or more reporting schedules 210 corresponding to the endpoints 104 that report their resource consumption data to the data collector 102. In some instances, such as if the central office 108 sends the data collector 102 a completed master reporting schedule, the data collector 102 may not need to include the reporting module functionality and may instead rely on the master reporting schedule provided by the central office 102. In that case, the data collector 102 may still include the reporting schedule(s) 210, such as the master reporting schedule received from the central office 108.

In addition to the radio 202, the data collector 102 may include one or more other network connections 212, such as power line communications (PLC) connections, Ethernet or other wired network connections, cellular communication connections, or the like. As such, the data collector 102 also includes any ancillary hardware, modules, and/or interfaces associated with or needed for the operation of the particular network connections.

Example Endpoint

Figure 3:
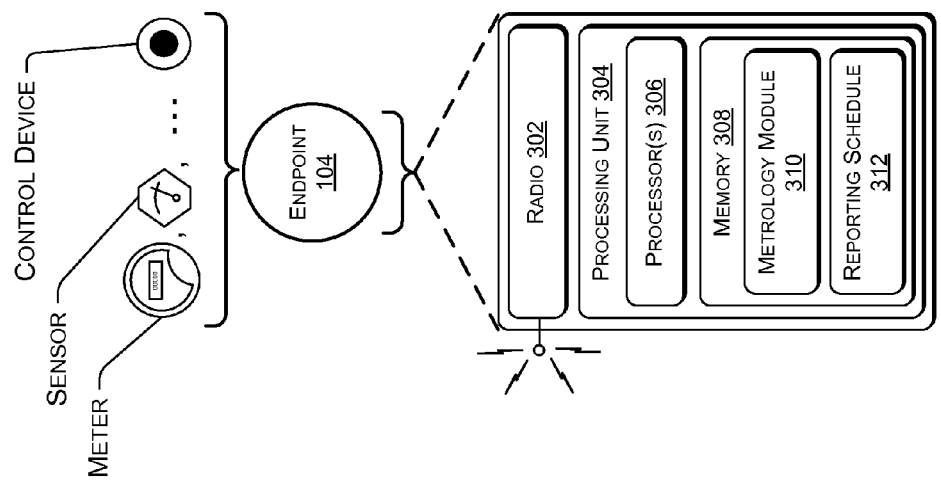
FIG. 3 is a schematic diagram showing additional details of an example endpoint of the architecture of FIG. 1.

FIG. 3 is a diagram showing example details of an individual endpoint 104. The endpoint 104 may be configured for interaction with the example data collector of FIG. 2. The endpoint 104 may be configured as or disposed at a smart utility meter, a sensor, a control point, or other computing device capable of collecting or communicating data to a central office of an AMI or similar utility communication network.

In one example, the endpoint 104 may include a radio 302 and a processing unit 304. The radio 302 may provide two-way RF communication with the data collector 102 and/or other endpoints. The processing unit 304 may include one or more processors 306 and memory 308 and/or other hardware device(s), such as an application specific integrated circuit (ASIC), a gate array or other hardware-based logic device. In a manner similar to that described with reference to the data collector 102 of FIG. 2, the endpoint 104 of FIG. 3 may include software functionality configured as one or more "modules" within the memory 308. Accordingly, while various "modules" are discussed, their functionality and/or similar functionality could be arranged differently.

A metrology module 310 may be configured to receive consumption data that is obtained from a meter (which may be integral to or associated with the endpoint). The metrology module 310 may provide the consumption data to the data collector 102 (of FIGS. 1 and 2) by RF transmission via the radio 302. The consumption data may be formatted and/or packetized in a manner or protocol expected by the data collector 102 and may be reported according to a reporting schedule 312. As discussed above, the reporting schedule 312 may be communicated to the endpoint 104 from the data collector 102, and may include, for example, a starting time, transmission protocol, frequency, and/or number of times/attempts that the endpoint is to report its resource consumption data.

The memories 114, 208, and 304 are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Quality of Service (QoS) Definitions

Figures 4, 5:
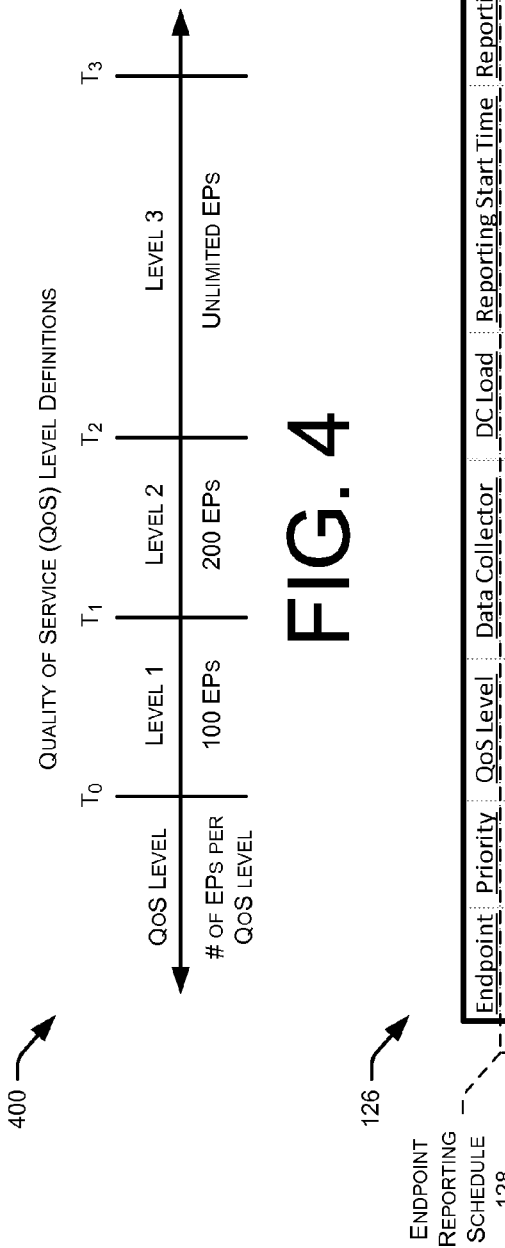
FIG. 4 is a schematic diagram that illustrates example quality of service definitions over a period of time, such as a day.
FIG. 5 is a table illustrating an example master scheduling report showing a variety of information for each endpoint, including an endpoint priority, quality of service level, primary data collector, a load on the primary data collector, a reporting start time, a reporting frequency, and a number of reporting attempts.

FIG. 4 illustrates an example quality of service (QoS) definition chart 400, which defines the multiple QoS levels used by the utility company to regulate the reporting of resource consumption data of the endpoints administered by the utility company. Generally, each reporting period is broken into multiple different time slots or windows, and the QoS levels are allocated across one or more of the time slots so that nodes associated with each QoS level will report their resource consumption data by a time at which the utility company needs the resource consumption data for billing or other purposes. FIG. 4 is merely one of many different ways in which the QoS levels may be defined. By way of example and not limitation, the QoS levels may alternatively defined in a tabular format, graphical format, formula and/or equation, or according to any other method or technique suitable for machine and/or human interpretation.

In the illustrated example, the reporting period is represented by the horizontal axis. The reporting period may be any period of time. In the given example, the reporting period is twenty-four hours, taken from midnight (0:00:00) to the following midnight (24:00:00). In the illustrated example, the QoS chart 400 illustrates that the reporting period has been broken into three time slots $T_0$-$T_1$, $T_1$-$T_2$, and $T_2$-$T_3$. Each time slot is allocated a QoS level and a maximum number of endpoints allowed for the QoS level. The maximum number of endpoints that is allowed for each QoS level depends on a variety of factors, such as, for example, the duration of the time slot associated with the QoS level, the number of times each endpoint associated with the QoS level is scheduled to report its resource consumption data. As shown, the first time slot, $T_0$-$T_1$, is designated QoS Level 1 and is allowed to include up to 100 endpoints, the second time slot, $T_1$-$T_2$, is designated QoS Level 2 and is allowed to include up to 200 endpoints, and the third time slot, $T_2$-$T_3$, is designated QoS Level 3 and is allowed to include an unlimited number of endpoints (or at least not limited by the QoS definitions). The number of endpoints allowed for each QoS level is chosen so that, during the associated time period, all of the endpoints associated with the QoS Level should be able to successfully report their resource consumption data to their respective data collector. However, in some embodiments, to ensure that all endpoints associated with a QoS level have time to complete their reporting, the QoS levels may simply be associated with a start time without having any defined end time. For example, QoS Level 1 may begin at $T_0$ and continue until all endpoints associated with QoS Level 1 have concluded their reporting. Likewise, QoS Level 2 may commence at $T_1$ and may continue until all endpoints associated with QoS Level 2 have concluded their reporting. QoS Level 3 may commence at $T_2$ and may continue until all endpoints associated with QoS Level 3 have concluded their reporting. However, in some implementations, there may be a mandatory reporting end time for each day or other reporting period to allow sufficient time for the data collector 102 to pass the resource consumption data to the central office 108 and to complete any other necessary processing of the collected data.

As shown in FIG. 4, the time periods need not be of equal length. In one example, the first time period may correspond to one hour (e.g., 0:00:01-1:00:00), the second time period may correspond to a subsequent hour (e.g., 1:00:01-2:00:00), and the third time period may correspond to the remainder of the reporting period (e.g., 2:00:01-20:00:00). Thus, during the first hour of the reporting period, all endpoints associated with QoS Level 1 should be able to successfully report their resource consumption data to their respective data collector. Likewise, during the second hour of the reporting period, all endpoints associated with QoS Level 2 should be able to successfully report their resource consumption data to their respective data collector. All remaining endpoints in this example are associated with QoS Level 3 and should be able to successfully report their resource consumption data to their respective data collector during the third time period.

While three QoS levels are shown in FIG. 4, in other examples, any greater or lesser number of QoS levels may be used. Furthermore, while in FIG. 4 the QoS levels are shown to match up one-to-one with the first, second, and third time periods, in other examples, one or more QoS levels may span multiple time periods. For example, in another implementation, QoS Level 3 could be configured to start at $T_1$, concurrently with QoS Level 2, but QoS Level 3 may continue on to $T_3$, while QoS Level 2 ends at $T_3$. In that case, endpoints associated with QoS Level 2 may be configured to report more frequently (e.g., every 15 minutes) and for a greater number of attempts (e.g., report 4 times) as compared to endpoints associated with QoS Level 3 (which might be configured to report every 5 hours for 3 attempts, for example).

The QoS level to which a particular endpoint is assigned is based at least in part on a relative priority of the endpoint. In some examples, the QoS level to which a particular endpoint is assigned may additionally depend on a data collector to which the node is assigned, a load (in terms of number of endpoints and/or volume of network traffic) on the data collector to which the endpoint is assigned, and/or a number of data collectors with which the endpoint is able to communicate. For example, despite a high priority, an endpoint may be placed in a lower QoS if, for example, the only data collector with which the endpoint is able to communicate is highly loaded such that associating the endpoint with the higher QoS would result in overloading the data collector.

Example Reporting Schedules

FIG. 5 illustrates as additional details of the master reporting schedule 126 shown in FIG. 1. The master reporting schedule 126 is made up of multiple individual endpoint reporting schedules 128, with one endpoint reporting schedule for each endpoint in the AMI or other utility communication network, or for each endpoint associated with one or more data collectors in such a network. In FIG. 5, each row of the master reporting schedule 126 represents an endpoint reporting schedule 128. In the example of FIG. 5, the reporting schedule includes a list of "Endpoints" in the left column. For each endpoint in the list, the reporting schedule also includes a "Priority" of the endpoint, a "QoS Level" assigned to the endpoint, a "Data Collector" with which the endpoint is associated, a "DC Load" on the data collector with which the endpoint is associated, a "Reporting Start Time" for the endpoint, a "Reporting Frequency" for the endpoint, and a number of "Attempts" that the endpoint is to make to report its resource consumption data. The specific fields included in the master reporting schedule 126 are merely illustrative and in other embodiments, reporting schedules may include fields different or similar to those described herein together with other fields or data relevant to scheduling reporting of resource consumption data. Moreover, the values shown in the master reporting schedule 126 are merely examples and might be different for every utility communication network.

The values shown in the master reporting schedule 126 are self explanatory and will not be described in detail herein. However, it is worth noting that the first five rows of the master reporting schedule 126 in this example are representative of the endpoints 104-1 through 104-5 of FIG. 1. As shown in the master reporting schedule 126, endpoint 104-1 has a first priority and a first QoS level and is therefore configured to start reporting its resource consumption data at the beginning of the reporting period (i.e., at $T_0$ in this example), to report at a high frequency (i.e., every 10 minutes in this example), and to report a relatively high number of times (five attempts in this example). In this way, it is highly likely that endpoint 104-1 will successfully report its resource consumption data to data collector 102 prior to the other endpoints 104-2 thorough 104-5. Endpoint 104-3 has the second priority and second QoS level and consequently will report its resource consumption data next according to the schedule listed for that endpoint (i.e., beginning at $T_1$ and again every 15 minutes for 4 attempts in this example), followed by endpoints 104-2, 104-4, and 104-5 (i.e., beginning at about $T_2$ and again every 5 hours for 3 attempts in this example).

It is also worth calling attention to the priority and QoS level associated with endpoint 128, which highlights an example of a situation in which the QoS level may not necessarily match the priority level. As shown, endpoint 128 has Priority 1, but is nevertheless downgraded to QoS Level 2 because the data collector with which it is associated (i.e., data collector 2 in this example) is heavily loaded at 96% of its capacity. Accordingly, endpoint 128 (and potentially other nodes associated with data collector 2) is not associated with QoS Level 1, since doing so might result in data collector 2 becoming over loaded. This downgrade of QoS level may be temporary, and endpoint 128 may be associated with QoS Level 1 when the load on data collector 2 is reduced (e.g., by migrating one or more endpoints to communicate with a different data collector).

Figure 6:
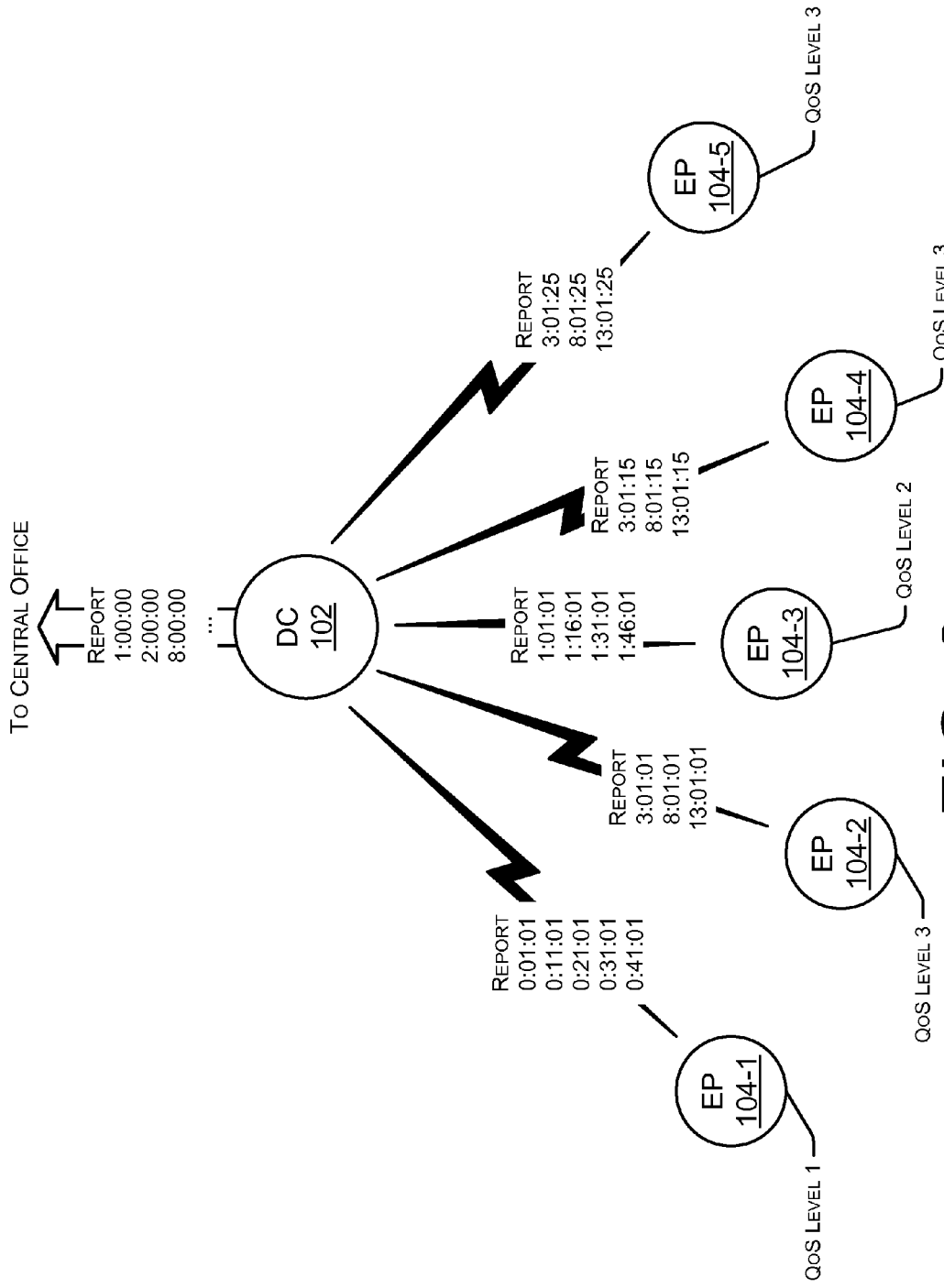
FIG. 6 is a schematic diagram showing an example of how the endpoints of FIG. 1 bubble up their resource consumption data in a prioritized manner.

FIG. 6 is a schematic diagram illustrating an example of how endpoints 104-1 through 104-5 report their resource consumption data to data collector 102 according to the example reporting schedule 126. FIG. 6 also illustrates how data collector 102 may subsequently relay the resource consumption data from endpoints 104-1 through 104-5 to the central office 108. As shown, endpoint 104-1 is first in priority and begins reporting its data early in the first period of time (i.e., at 0:01:01 in this example), and then again four more times at ten minute intervals, for a total of five attempts. While in this example, the attempts are shown at exactly ten minute intervals, in other examples, the attempts may vary somewhat from the scheduled frequency. For example, randomization may be introduced, to prevent packet collisions that may result from a regularized schedule. Endpoint 104-3 is Priority 2 and begins reporting its data next, early in the second period of time (i.e., at 1:01:01 in this example), and then again three more times at fifteen minute intervals, for a total of four attempts. Finally, endpoints 104-2, 104-4, and 104-5, which are Priority 3, begin reporting their data in the third period of time and each reports its data three times. The endpoints 104-2, 104-4, and 104-5 report their data at staggered times to avoid collisions of the data transmissions.

In addition to prioritizing the times at which endpoints report their data to the data collector 102, the data collector 102 may relay resource consumption data received from priority endpoints to the central office sooner or more frequently than it does for lower priority endpoints. In the illustrated example, data collector 102 is shown to report resource consumption data to the central office 108 at times when the data collector is likely to have collected resource consumption data from all endpoints associated with a particular QoS level. For example, the data collector 102, in this example, reports resource consumption data to the central office at 1:00:00 and 2:00:00, which correspond to the conclusion of the first and second time periods, respectively. Thus, by 1:00:00 all endpoints associated with QoS Level 1 should have concluded reporting their resource consumption data, and by 2:00:00 all endpoints associated with QoS Level 2 should have concluded reporting their resource consumption data. The data collector 102, in this example, reports resource consumption data to the central office again at 8:00:00, by which point all QoS Level 3 nodes should have reported their resource consumption data to the data collector 102 at least once. The data collector 102 may continue to relay consumption data to the central office 108 periodically until conclusion of the third period of time. In other embodiments, the data collector 102 may relay resource consumption data to the central office 108 at other scheduled times, upon receipt from the endpoints, upon receipt of all endpoints associated with a particular QoS level, or the like.

Example Methods of Reporting Resource Consumption Data

Figure 7:
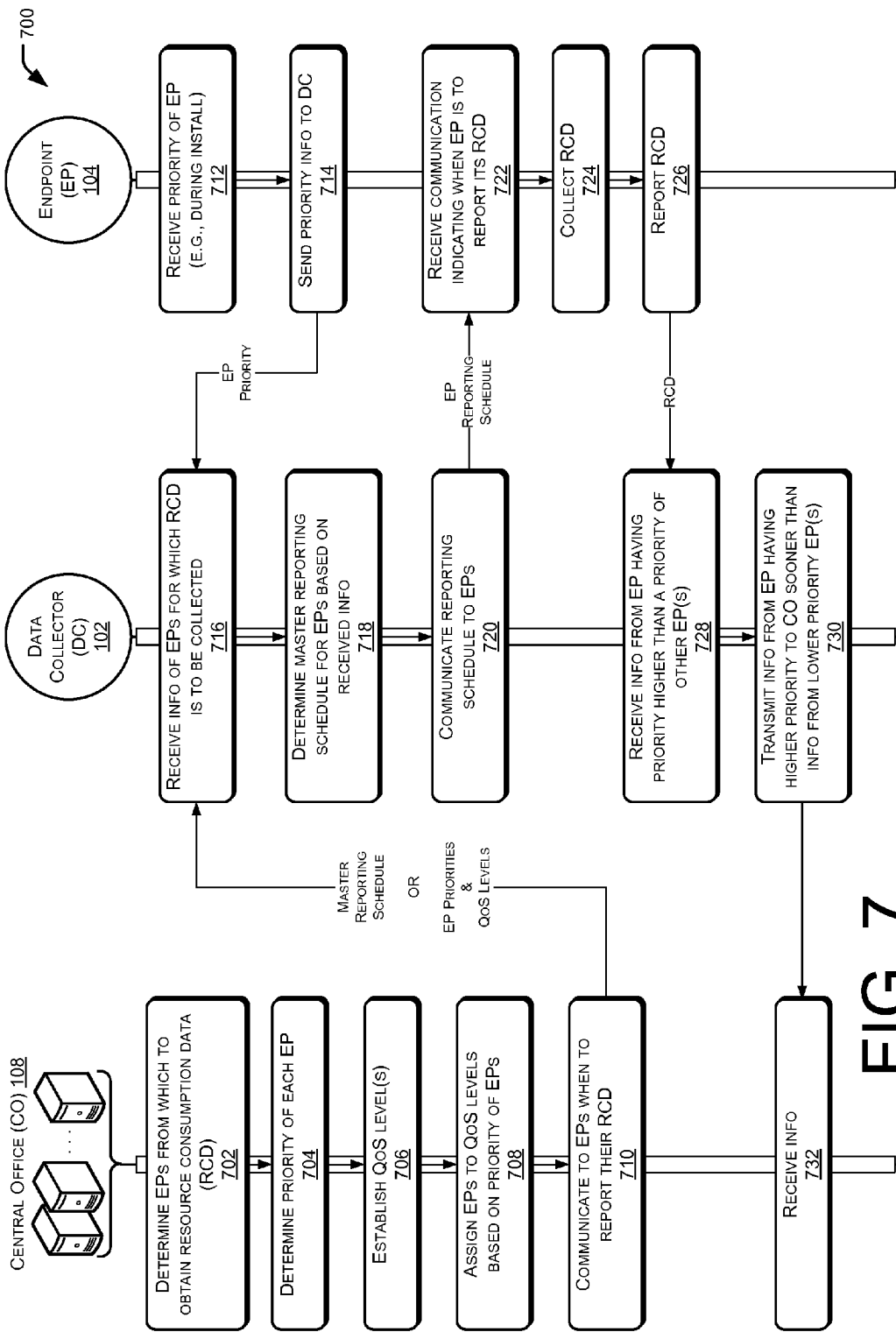
FIG. 7 is a signal flow diagram illustrating example methods performed by the endpoints, the data collector, and a central office.

FIG. 7 is a signal flow diagram which illustrates an example flow of operations 700 that may be performed by various devices of a utility communication network and/or AMI to facilitate prioritized reporting of resource consumption data. The example flow of operations 700 is described in the context of the example of system 100 and using the central office 108, data collector 102, and one of the endpoints 104 of FIG. 1. However, the flow of operations 700 is not limited to use with the system and devices of FIG. 1 and may be implemented using other systems and devices.

The flow of operations 700 begins, at block 702, with a server of a central office of a utility company, such as central office 108, determining one or more endpoints from which to obtain resource consumption data. Typically, the endpoints from which the central office is to obtain resource consumption data will be all endpoints administered by the utility company. However, in other examples, the endpoints determined at block 702 may be a subset of the endpoints administered by the utility company, such as when the subset is associated with a particular time period, endpoint type (e.g., commercial or residential) and/or geographic area. At block 704, the server of the central office determines a relative priority of the endpoints determined at block 702. At block 706, the server of the central office establishes multiple quality of service (QoS) levels, such as the QoS levels described with reference to FIG. 4, for example. In practice, establishment of the QoS levels may occur before or after the determination of endpoints and their priorities in blocks 702 and 704. Then, at block 708, the central office assigns each of the endpoints determined in block 702 to one of the QoS levels established in block 706.

At block 710, the central office communicates to each endpoint when, based on the respective quality of service level, the respective endpoint is to report its resource consumption data. This information may be communicated to the endpoints via a data collector, such as data collector 102.

The information may be communicated to the data collector in the form of a master reporting schedule, such as the master reporting schedule 126 shown in FIG. 5. Alternatively, the information may be communicated to the data collector in the form of the priority information from block 704 and the QoS levels established at block 706.

In the example implemented at block 712, individual endpoints, such as endpoints 104, may receive an indication of their relative priority during installation. The indication may be transmitted from the respective data collector, or may be set at installation and/or manufacture. At block 714, the individual endpoints may transmit their priority information to the data collector with which they are associated. This may be in addition to or instead of the priority information provided to the data collector by the central office.

At block 716, the data collector receives information about endpoints for which resource consumption data is to be collected. As discussed, this information may be received from the central office and/or one or more individual endpoints. Then, at block 718, the data collector may determine a master reporting schedule for the endpoints for which it is responsible. The data collector may determine the master reporting schedule simply by referring to a master reporting schedule if one was received from the central office. If no master reporting schedule was received from the central office, then the data collector may generate a master reporting schedule based on the priority information and the QoS levels. Regardless of how the data collector determines the mater reporting schedule, at block 720, the data collector communicates to each endpoint its particular reporting schedule.

At block 722, the endpoint receives its reporting schedule indicating when it is to report its resource consumption data. At block 724 the endpoint collects resource consumption data, such as from an associated metering device via metrology module 310 of the endpoint 104. At block 726, the endpoint reports or bubbles up its resource consumption data according to the reporting schedule previously received from the data collector.

At block 728, the data collector receives the resource consumption data from the endpoint. In this example, the endpoint (e.g., endpoint 104-1) has a higher priority than other endpoints reporting to the data collector. At block 730, the data collector transmits the resource consumption data from the endpoint having higher priority to the central office sooner than it would transmit information received from endpoint(s) having a lower priority to the central office. In other words, data received from a high priority endpoint is forward to the central office more quickly after its receipt from the endpoint than data received from lower priority endpoints. Finally, at block 732, the central office receives the resource consumption data of the endpoints having the higher priority and/or QoS level sooner and/or more frequently than resource consumption data of other lower priority endpoints.

The flow of operations 700 is illustrated as a collection of blocks and/or arrows representing a sequence of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer instructions that, when executed by one or more processors, perform the recited operations. In the context of hardware, the blocks may represent one or more circuits (e.g., application specific integrated circuits—ASICs) configured to execute the recited operations.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for managing reporting of resource consumption data, the system comprising:
   one or more processors; and
   memory communicatively coupled to the one or more processors and storing instructions that, when executed, configure the one or more processors to perform acts comprising:
      determining a plurality of endpoints from which to obtain resource consumption data;
      determining a relative priority of each endpoint of the plurality of endpoints;
      establishing multiple quality of service levels;
      assigning each endpoint of the plurality of endpoints to one of the multiple quality of service levels based at least in part on the relative priority of the respective endpoint; and
      communicating to each endpoint when, based on the respective quality of service level, the respective endpoint is to report its resource consumption data, the communicating comprising sending a message to a data collector associated with the respective endpoint.

2. The system of claim 1, wherein each quality of service level of the multiple quality of service levels is associated with one or more periods of time each day.

3. The system of claim 1, wherein the multiple quality of service levels include at least a first quality of service level that is higher than a second quality of service level, and wherein fewer endpoints are assigned to a period of time associated with the first quality of service level than are assigned to a period of time associated with the second quality of service level.

4. The system of claim 1, wherein the relative priority of each endpoint is based in part on a service level agreement between a customer and a company that operates the system.

5. The system of claim 1, wherein a reporting period comprises multiple different windows of time, each window of time being associated with one or more quality of service levels.

6. The system of claim 1, wherein assigning each endpoint of the plurality of endpoints to one of the multiple quality of service levels is further based on a number of endpoints served by a data collector serving the respective endpoint and a load on the data collector serving the respective endpoint.

7. A method comprising:
   under control of one or more processors programmed with executable instructions:
      determining a plurality of endpoints from which to obtain resource consumption data;
      determining a relative priority of each endpoint of the plurality of endpoints;
      establishing multiple quality of service levels;

assigning each endpoint of the plurality of endpoints to one of the multiple quality of service levels based at least in part on:
  the relative priority of the respective endpoint;
  a number of endpoints served by a data collector serving the respective endpoint; and
  a load on the data collector serving the respective endpoint; and
communicating to each endpoint when, based on the respective quality of service level, the respective endpoint is to report its resource consumption data.

8. The method of claim 7, wherein communicating to each endpoint when the respective endpoint is to report its resource consumption data comprises sending a message to a data collector associated with the respective endpoint.

9. The method of claim 7, wherein each quality of service level of the multiple quality of service levels is associated with one or more periods of time each day.

10. The method of claim 7, wherein the multiple quality service levels include at least a first quality of service level that is higher than a second quality of service level, and wherein fewer endpoints are assigned to a period of time associated with the first quality of service level than are assigned to a period of time associated with the second quality of service level.

11. The method of claim 7, wherein the relative priority of each endpoint is based in part on a service level agreement between a customer and a company that operates the system.

12. The method of claim 7, wherein a reporting period comprises multiple different windows of time, each window of time being associated with one or more quality of service levels.

13. A computing device comprising:
one or more processors; and
memory communicatively coupled to the one or more processors storing instructions executable by the one or more processors to perform operations comprising:
  determining a plurality of nodes in a communication network from which to obtain resource consumption data;
  determining a relative priority of each node of the plurality of nodes;
  establishing multiple quality of service levels;
  assigning each node of the plurality of nodes to one of the multiple quality of service levels based at least in part on the relative priority of the respective node, the multiple quality of service levels including at least a first quality of service level that is higher than a second quality of service level, wherein fewer nodes are assigned to a period of time associated with the first quality of service level than are assigned to a period of time associated with the second quality of service level; and
  communicating to each node when, based on the respective quality of service level, the respective node is to report its resource consumption data.

14. The computing device of claim 13, wherein communicating to each node when the respective node is to report its resource consumption data comprises sending a message to the node.

15. The computing device of claim 13, wherein each quality of service level of the multiple quality of service levels is associated with one or more periods of time each day.

16. The computing device of claim 13, wherein the relative priority of each node is based in part on a service level agreement between a customer and a company that operates the system.

17. The computing device of claim 13, wherein a reporting period comprises multiple different windows of time, each window of time being associated with one or more quality of service levels.

18. The computing device of claim 7, wherein assigning each node of the plurality of nodes to one of the multiple quality of service levels is further based on a number of nodes served by a data collector serving the respective node and a load on the data collector serving the respective node.

19. The computing device of claim 7, wherein the relative priority of each node is based in part on a billing schedule of a customer associated with the node.

20. The system of claim 1, wherein the relative priority of each endpoint is based in part on a characteristic of a customer associated with the endpoint.

* * * * *